United States Patent Office 3,405,225
Patented Oct. 8, 1968

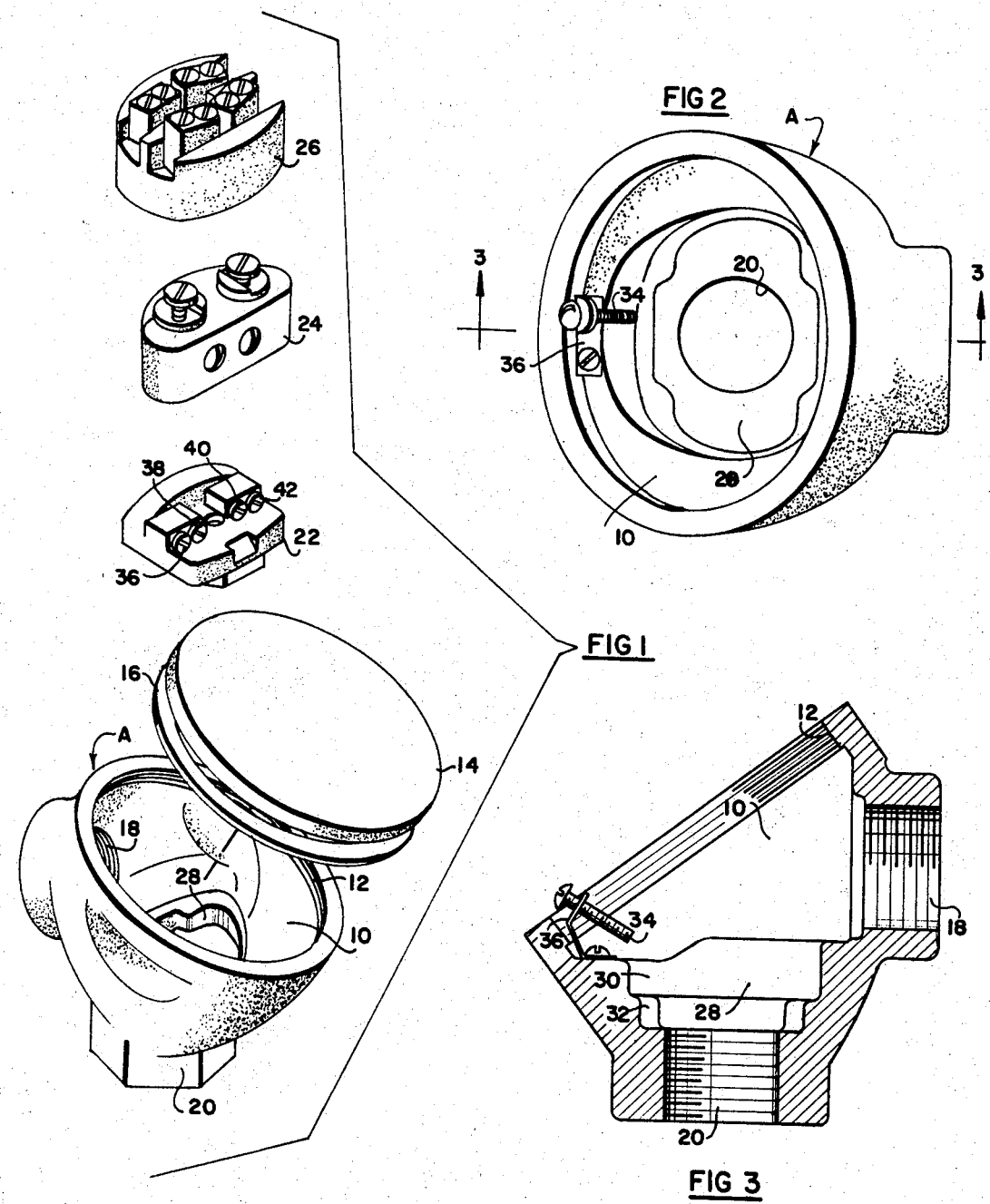

3,405,225
UNIVERSAL THERMOCOUPLE HEAD
Raymond F. McHugh, Jr., 9209 Ditman St.,
Philadelphia, Pa. 19114
Filed Aug. 13, 1965, Ser. No. 479,505
2 Claims. (Cl. 174—52)

ABSTRACT OF THE DISCLOSURE

A universal thermocouple head provided with an internal recess having one or more tiers, the said tiers having shaped peripheral configurations to receive and retain terminal blocks manufactured by various producers.

---

This invention relates to the general field of high temperature measurements and is more particularly directed to a universally adaptable thermocouple head having general interchangeable application in the art.

Thermocouples as now in use commonly employ a bimetallic sensing wire enclosed within a protective tube. A specially designed thermocouple head threadedly receives the protective tube and is provided with a second threaded opening to receive the lead wires and the wire enclosing conduit. The head houses a terminal connecting block therewithin and a large threaded cover in the head fitting permits easy access to the terminal block.

As may be readily appreciated, there are many large manufacturers of thermocouples in the country and all produce to satisfactory standards. With a number of equally good brands available, after a period of operation, most plants employing thermocouples, will be equipped with many similar items of different manufacture. When the thermocouple components begin to wear, operating personnel then find that the various parts from different manufacturers are not interchangeable. This problem results either in causing the maintaining of a large inventory of parts of all manufacturers represented or in replacing some of the thermocouples so that all in use will be the same make. Either solution will, of course, prove to be quite costly.

It is therefore an object of this invention to provide an improved device of the type set forth.

It is a further object of this invention to provide a novel universal thermocouple head featuring unique internal configuration.

It is a further object of this invention to provide a novel universal thermocouple head housing a multi-shaped internal recess.

It is a further object of this invention to provide a novel universal thermocouple head incorporating universal terminal block receiving and locking facilities.

It is a further object of this invention to provide a novel universal thermocouple head employing a single device of one manufacture that is designed for use with all terminal blocks of various manufacture.

It is another object of my invention to provide a universal thermocouple head that is simple in operation, rugged in construction and inexpensive in manufacture.

Other objects and a fuller understanding of the invention will be had by referring to the following description and claims of a preferred embodiment thereof, taken in conjunction with the accompanying drawings, wherein like reference characters refer to similar parts throughout the several views and in which:

FIG. 1 is a front perspective view of the invention with the cover removed, and with terminal blocks of various manufacture and configuration indicated in exploded relation.

FIG. 2 is a top plan view of the invention.

FIG. 3 is a cross section taken along line 3—3 of FIG. 2 and looking in the direction of the arrows.

Although specific terms are used in the following description for the sake of clarity, these terms are intended to refer only to the particular structure of my invention selected for illustration in the drawings and are not intended to define or limit the scope of the invention.

Referring now to FIG. 1, I show a single thermocouple head A which has been designed and constructed in accordance with the instant invention. The head is of the usual angular type and may be cast or otherwise formed of aluminum or other suitable metal to define an interior body cavity 10. The head terminates upwardly in an inclined, threaded opening 12 to receive a cover 14 that is threadedly engaged therewith in the usual manner. A gasket 16 of suitable material seals the joint between the cover and the head in any well-known manner.

A forwardly facing threaded opening 18 communicates with the body cavity 10 and receives a thermocouple protection tube (not shown) in the usual manner. Similarly, a downwardly facing threaded opening 20 communicates with the body cavity 10 and receives the lead wire carrying conduit (not shown) also in any well-known manner.

The body cavity 10 receives and in cooperation with the cover 14 encloses a terminal connecting block 22 which is provided to facilitate making the required electrical connections between the lead wires and the thermocouple wires in accordance with ordinary practice. As illustrated in FIG. 1, various shaped terminal blocks 24, 26, each of different manufacture may be used for the same purpose. However, by utilizing the instant invention, only the terminal connecting block need be replaced when the part becomes worn or when an entirely new thermocouple is to be employed. The lead itself need not be disturbed as its multi-shaped recess 28 has been carefully designed and formed to all popularly used terminal blocks. While only three different terminal connecting blocks have been shown for purposes of illustration, it will be readily appreciated that the principles herein discussed are equally applicable to any number of different manufacturers' equipment.

As shown in the drawings, the multi-shaped recess 28 may be provided with as many cut out shapes as may be required to receive and hold the various individual terminal connecting blocks. In designing the overall configuration of the recess 28, the peripheral contours of each terminal block should be plotted, and where similar contours may be superimposed on each other, the same portion of the recess configuration may be used for more than one manufacturer's product. As best seen in FIG. 3, it is sometimes desirable to provide more than one level within the recess, such as an upper receptacle 30 and lower receptacle 32 to accommodate as many terminal blocks as possible within a limited recess area. While a two level recess is herein indicated, it should be noted that recesses employing both fewer and more levels than illustrated are within the scope of this invention.

A universal set screw 34 that is angularly secured within the cavity 10 by a metal upright 36 downwardly engages the top of the terminal connecting block to assure a positive seat within the recess 28. The upright 36 is threaded to receive the set screw 34 and is preferably constructed of sheet metal of sufficient rigidity for the purpose that may be permanently deformed by a pair of pliers or a similar tool as required to secure the terminal block within the recess.

In order to use this invention, the universal thermocouple head A should be permanently installed in the usual manner near the area where temperature measurements are required. The cover 14 can then be disengaged from the head to expose the body cavity 10. A terminal connecting block 22, 24 or 26 should be oriented within the cavity and the necessary wires connected to the terminals 36, 38, 40, 42 in the usual fashion. Once the wires (not shown) have been connected to the proper respective terminals, the terminal connecting block should be carefully fitted within the recess 28 until the terminal block securely seats against the corresponding receiving construction that has been provided in the recess. The angle of the upright 36 should then be adjusted to aim the set screw 34 in the optimum direction as required by the top configuration of the actual terminal connecting block being utilized. The set screw 34 may then be turned in the upright 36 until its point engages the top of the terminal block to assure a firm construction. Upon replacement of the cover 14 in the threaded opening 12, the entire thermocouple assembly will then be ready for operation.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. In a universal thermocouple head, the combination of
   (A) a hollow body portion,
      (1) said body being provided with a top opening
         (a) said opening being sized to receive terminal connection blocks of varying lateral cross sectional configurations therein;
   (B) said body having a shaped recess provided at the bottom thereof,
      (1) the sidewalls of said recess defining peripheral configurations to snugly receive a first terminal connecting block,
      (2) said recess sidewalls having additional peripheral configurations to alternately snugly receive a second terminal connecting block,
         (a) the said second terminal connecting block having external configuration and size different from the configuration and size of the said first terminal connecting block;
   (C) a set screw threadedly carried by the said body
      (1) said set screw being positioned to contact a portion of either said terminal block when the block is positioned within the said recess; whereby a plurality of differently shaped terminal connecting blocks can be individually securely seated within the recess by utilizing those portions of the recess enclosing walls that correspond to the configuration of the terminal connecting block being accommodated.

2. The invention of claim 1 wherein the said recess is divided into a plurality of layers, the transverse dimensions of the said layers being increased in the direction of the interior of the said body portion, each of said layers having sidewall configuration to snugly receive one of said terminal connecting blocks.

References Cited

UNITED STATES PATENTS

| | | | |
|---|---|---|---|
| 3,142,783 | 7/1964 | Warren | 174—68.5 X |
| 3,191,791 | 6/1965 | Jackson | 206—46 X |

OTHER REFERENCES

Ritchey et al., Instrumentation, "Current from Temperature," vol. 10, No. 1, January-February 1957, pages 26–29.

LARAMIE E. ASKIN, *Primary Examiner.*